(12) United States Patent
Nakanishi

(10) Patent No.: US 12,367,755 B2
(45) Date of Patent: Jul. 22, 2025

(54) NOTIFICATION DEVICE

(71) Applicant: TOYOTA JIDOSHA KABUSHIKI KAISHA, Toyota (JP)

(72) Inventor: Ryota Nakanishi, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/242,763

(22) Filed: Sep. 6, 2023

(65) Prior Publication Data

US 2024/0105049 A1 Mar. 28, 2024

(30) Foreign Application Priority Data

Sep. 27, 2022 (JP) ................................ 2022-154212

(51) Int. Cl.
*G08B 25/10* (2006.01)
*B60R 25/01* (2013.01)
*G08G 1/16* (2006.01)

(52) U.S. Cl.
CPC ............. *G08B 25/10* (2013.01); *G08G 1/167* (2013.01); *B60R 25/01* (2013.01)

(58) Field of Classification Search
None
See application file for complete search history.

(56) References Cited

U.S. PATENT DOCUMENTS

| 7,759,818 B2* | 7/2010 | Fuchigami | B60R 25/24 307/10.2 |
| 10,430,889 B1* | 10/2019 | Ismaili | G06Q 10/0635 |
| 2002/0126009 A1* | 9/2002 | Oyagi | G08B 27/006 340/541 |
| 2009/0261969 A1* | 10/2009 | Kobayashi | B60R 25/102 340/5.1 |
| 2010/0085171 A1* | 4/2010 | Do | G08B 25/10 348/148 |
| 2016/0185318 A1* | 6/2016 | Teng | G08B 13/24 701/36 |
| 2020/0130654 A1* | 4/2020 | Kamada | B60W 40/02 |
| 2020/0193734 A1 | 6/2020 | Kamata et al. | |
| 2021/0018913 A1* | 1/2021 | Hanawa | G05D 1/0027 |
| 2021/0323568 A1* | 10/2021 | Kaino | B60W 30/18163 |
| 2022/0063609 A1* | 3/2022 | Nagasawa | B60W 30/095 |
| 2022/0134995 A1* | 5/2022 | Kim | B60R 22/48 340/457.1 |
| 2022/0272793 A1* | 8/2022 | Werner | G05B 19/042 |
| 2022/0292852 A1* | 9/2022 | Li | G08B 21/22 |

(Continued)

FOREIGN PATENT DOCUMENTS

| JP | 2007-233507 A | 9/2007 |
| JP | 2013-120409 A | 6/2013 |

(Continued)

*Primary Examiner* — Muhammad Adnan
(74) *Attorney, Agent, or Firm* — Oliff PLC

(57) ABSTRACT

A notification device, comprising a processor, wherein the processor is configured to receive an abnormality notification from an occupant of a vehicle, and in a case in which the abnormality notification has been received, notify a third party of vehicle information including position information of the vehicle and an image of surroundings of the vehicle, which are stored at the vehicle, and notify the third party that the vehicle is in an abnormal situation.

4 Claims, 5 Drawing Sheets

(56) References Cited

U.S. PATENT DOCUMENTS

| | | | |
|---|---|---|---|
| 2022/0410675 A1* | 12/2022 | Agata | G07C 5/0866 |
| 2023/0145724 A1* | 5/2023 | Kajiwara | B60Q 9/00 |
| | | | 701/70 |
| 2024/0054877 A1* | 2/2024 | Miyahara | G08B 21/0208 |

FOREIGN PATENT DOCUMENTS

| | | | |
|---|---|---|---|
| JP | 2013-122720 A | | 6/2013 |
| JP | 2017-151546 A | | 8/2017 |
| JP | 2020-097850 A | | 6/2020 |
| JP | 2021086209 A | * | 6/2021 |
| JP | 2021-157350 A | | 10/2021 |

* cited by examiner

NOTIFICATION DEVICE

CROSS-REFERENCE TO RELATED APPLICATION

This application is based on and claims priority under 35 USC 119 from Japanese Patent Application No. 2022-154212 filed on Sep. 27, 2022, the disclosure of which is incorporated by reference herein.

BACKGROUND

Technical Field

The present disclosure relates to a notification device.

Related Art

Japanese Patent Application Laid-open (JP-A) No. 2021-086209 discloses a driving assistance control device. The driving assistance control device determines whether or not a peripheral vehicle is performing dangerous driving, based on peripheral vehicle information including a relative positional relationship between the vehicle and the peripheral vehicle. Moreover, in cases in which the degree of danger of dangerous driving satisfies a first predetermined condition, the driving assistance control device sends report information presenting a report accompanied by a request for dispatch to a third party, including a police station or a security company. The report information includes information identifying the vehicle, the current position information of the vehicle, and information presenting a dispatch request.

The driving assistance control device disclosed in JP-A No. 2021-086209 is problematic in that there is a possibility of a report being made to a third party in a case in which the occupant is not aware of dangerous driving. Further, in an emergency, it is desirable to omit any exchange of conversation. However, since this driving assistance control device merely transmits report information to a third party, there is the problem that an occupant needs to hold a conversation with the third party when checking the current situation.

SUMMARY

The present disclosure, having been accomplished in consideration of the situation described above, aims to provide a notification device that can notify a third party only in cases in which an occupant wishes to notify the third party, and that can enable the occupant to concentrate on driving by enabling conversation with the third party to be omitted at a time of notification.

A notification device according to a first aspect includes a receiving unit that receives an abnormality notification from an occupant of a vehicle, and a notification unit that, in a case in which the receiving unit has received the abnormality notification, notifies a third party of vehicle information including position information of the vehicle and an image of surroundings of the vehicle, which are stored at the vehicle, and notifies the third party that the vehicle is in an abnormal situation.

In the notification device according to the first aspect, the receiving unit receives an abnormality notification from an occupant of the vehicle, and in a case in which the receiving unit has received the abnormality notification, the notification unit notifies a third party of vehicle information including position information of the vehicle and an image of surroundings of the vehicle, which are stored at the vehicle, and notifies the third party that the vehicle is in an abnormal situation. According to the notification device of the first aspect, a third party can be notified only in cases in which an occupant wishes to notify the third party, and the occupant can concentrate on driving since conversation with the third party can be omitted at a time of notification.

A notification device according to a second aspect is the notification device of the first aspect, further including an acquisition unit that acquires a distance between the vehicle and a peripheral vehicle in the surroundings of the vehicle, in which, in a case in which the receiving unit has received the abnormality notification and the distance acquired by the acquisition unit is less than a predetermined threshold, the notification unit notifies the third party of the vehicle information and that the vehicle is in an abnormal situation. According to the notification device of the second aspect, in cases in which an occupant mistakenly performs an abnormality notification despite the distance between the vehicle and the peripheral vehicle not being less than a predetermined threshold and notification to a third party not being required, notification to a third party can be prevented.

A notification device according to a third aspect is the notification device of the second aspect, in which, in a case in which the distance acquired by the acquisition unit is less than a predetermined threshold and the receiving unit has not received an abnormality notification, the notification unit notifies the occupant so as to change the lane in which the vehicle is traveling. According to the notification device of the third aspect, the likelihood of a rear-end collision from a peripheral vehicle can be reduced.

A notification device according to a fourth aspect is the notification device of any one of the first aspect to the third aspect, further including a control unit that performs control for at least one of locking a door lock or closing a window of the vehicle in cases in which the receiving unit has received the abnormality notification. According to the notification device of the fourth aspect, the likelihood of harm to the occupant can be reduced.

A notification device according to a fifth aspect is the notification device of any one of the first aspect to the fourth aspect, in which, in a case in which the receiving unit has received the abnormality notification, the notification unit notifies the occupant so as to stop the vehicle or to move further away from a peripheral vehicle in the surroundings of the vehicle, further to having changed a lane in which the vehicle is traveling. According to the notification device of the fifth aspect, further separation from the peripheral vehicle and protection of the safety of the occupant are possible.

According to the present disclosure, a third party can be notified only in cases in which an occupant wishes to notify the third party, and the occupant can concentrate on driving since conversation with the third party can be omitted at a time of notification.

BRIEF DESCRIPTION OF THE DRAWINGS

Exemplary embodiments to present disclosure will be described in detail based on the following figures, wherein.

DETAILED DESCRIPTION

Figure 1:
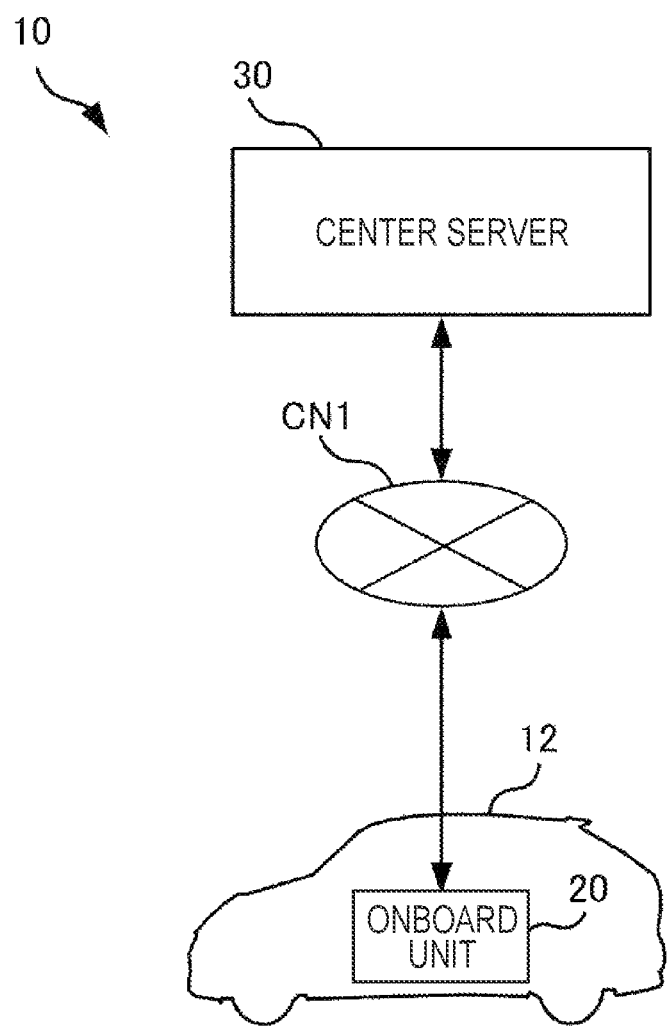
FIG. 1 is an example of a diagram illustrating a schematic configuration of a notification system according to an exemplary embodiment.

As illustrated in FIG. 1, the notification system 10 of the present exemplary embodiment is configured including a vehicle 12 and a center server 30. The vehicle 12 is installed with an onboard unit 20. The onboard unit 20 is an example of a notification device. The center server 30 is an example of a device held by a police station, a security company, or the like serving as a third party.

The onboard unit 20 and the center server 30 of the vehicle 12 are connected to each other through a network CN1.

(Center Server)

Figure 2:
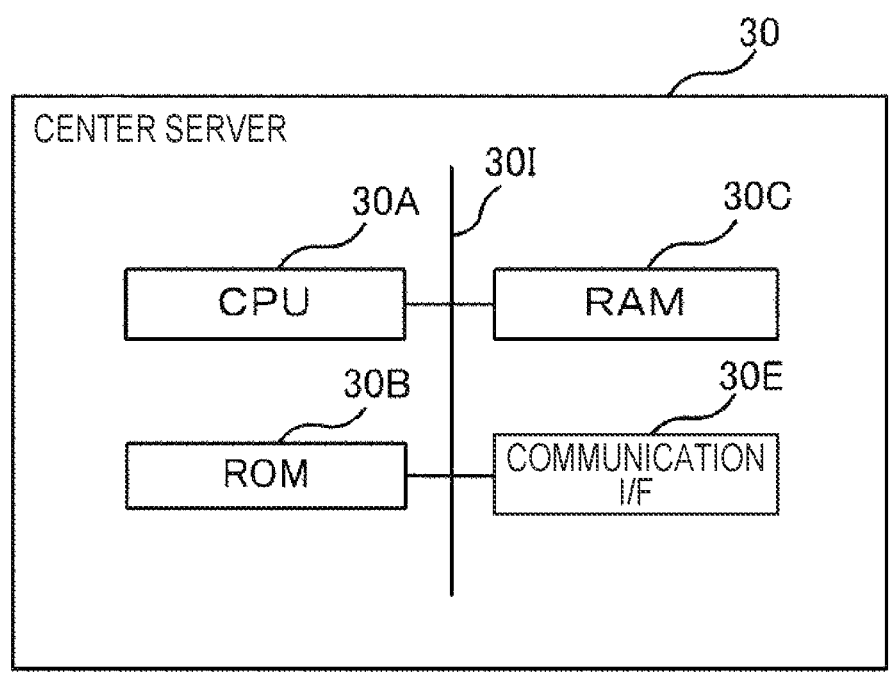
FIG. 2 is an example of a block diagram illustrating a hardware configuration of a center server of an exemplary embodiment.

As illustrated in FIG. 2, the center server 30 is configured including a central processing unit (CPU) 30A, read only memory (ROM) 30B, random access memory (RAM) 30C, and a communication I/F 30E. The CPU 30A, the ROM 30B, the RAM 30C, and the communication I/F 30E are connected so as to be capable of communicating with each other through an internal bus 301.

The CPU 30A executes various programs and controls various units. Namely, the CPU 30A, which is an example of a hardware processor, loads a program from the ROM 30B, which corresponds to a memory, and executes the program using the RAM 30C as a workspace. The CPU 30A controls the respective configurations described above and performs various computation processing in accordance with the program recorded in the ROM 30B.

The ROM 30B stores various programs and various data.

The RAM 30C serves as a workspace to temporarily store programs and data.

The communication I/F 30E is a wireless communication module for communicating with the vehicle 12. For example, a communication standard such as 5G, LTE, Wi-Fi (registered trademark) or the like is used for the wireless communication module. The communication I/F 30E is connected to the network CN1.

(Vehicle)

Figure 3:
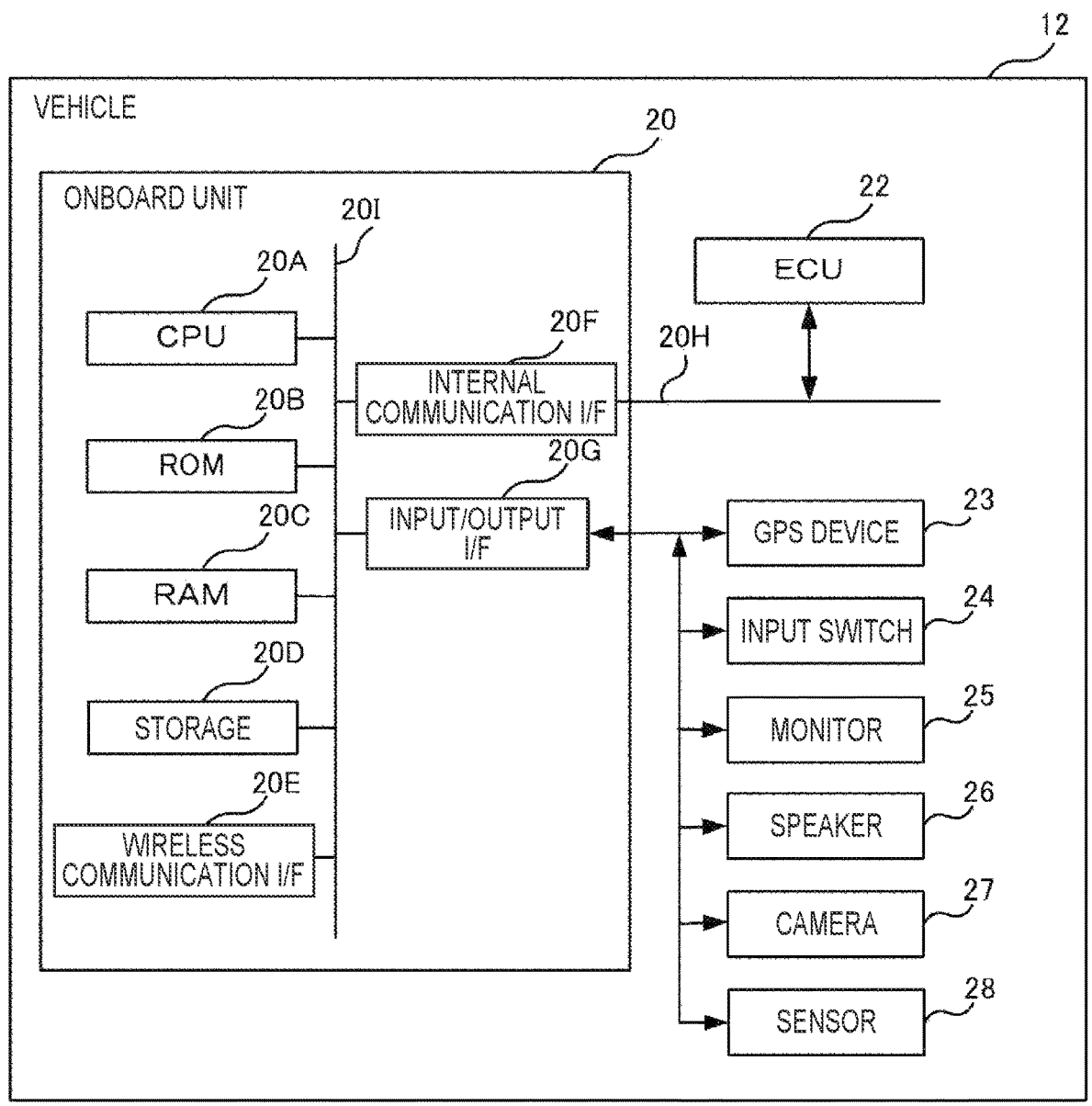
FIG. 3 is an example of a block diagram illustrating a hardware configuration of a vehicle of an exemplary embodiment.

As illustrated in FIG. 3, the vehicle 12 according to the present exemplary embodiment is configured including an onboard unit 20, an electronic control unit (ECU) 22, a global positioning system (GPS) device 23, an input switch 24, a monitor 25, a speaker 26, a camera 27, and a sensor 28.

The onboard unit 20 is configured including a CPU 20A, a ROM 20B, a RAM 20C, a storage 20D, a wireless communication I/F 20E, an internal communication I/F 20F, and an input/output I/F 20G. The CPU 20A, the ROM 20B, the RAM 20C, the storage 20D, the wireless communication I/F 20E, the internal communication I/F 20F, and the input/ output I/F 20G are connected so as to be capable of communicating with each other through an internal bus 201. The functionalities of the CPU 20A, the ROM 20B, the RAM 20C, and the wireless communication I/F 20E are the same as those of the CPU 30A, the ROM 30B, the RAM 30C, and the communication I/F 30E of the center server 30 described above.

The storage 20D is configured by a hard disk drive (HDD) or a solid state drive (SSD), and holds various programs including an operating system, as well as various data. The storage 20D of the present exemplary embodiment holds a processing program. The processing program is a program for implementing various functionalities held by the onboard unit 20. Moreover, the storage 20D of the present exemplary embodiment stores images of the surroundings of the vehicle 12 and position information for the vehicle 12. The processing program, images of the surroundings of the vehicle 12, and position information for the vehicle 12 may be stored in the ROM 20B.

The internal communication I/F 20F is an interface for connecting to the ECU 22. The ECU 22 includes an engine ECU, a brake ECU, a body ECU, a camera ECU, a multimedia ECU, and the like, in addition to a door lock ECU 22A and a window ECU 22B. A communication protocol based on the CAN protocol is used as the interface. The internal communication I/F 20F is connected to the external bus 20H.

The door lock ECU 22A, upon having a door locking signal input from the onboard unit 20, outputs a drive signal to an actuator of a door lock mechanism and locks the door.

The window ECU 22B, upon having a close signal input from the onboard unit 20, outputs a drive signal to the actuator of the window lock mechanism and closes the window of the vehicle 12.

The input/output I/F 20G is an interface for communicating with the GPS device 23, the input switch 24, the monitor 25, the speaker 26, the camera 27, and the sensor 28. Note that the GPS device 23, the input switch 24, the monitor 25, the speaker 26, the camera 27, and the sensor 28 may be connected to the onboard unit 20 through the ECU 22.

The GPS device 23 is a device that measures a current position of the vehicle 12. The GPS device 23 includes a non-illustrated antenna that receives signals from a GPS satellite. The current position of the vehicle 12 measured by the GPS device 23 is stored in the storage 20D as position information.

The input switch 24 is configured as a touch panel that also serves as a monitor 25. Note that the input switch 24 may be provided on an instrument panel, a center console, a steering wheel, or the like, and may be a switch that inputs an operation using an occupant's finger. The input switch 24 in this case may employ, for example, a push-button ten-key pad, a touch pad, or the like.

The monitor 25 is a liquid crystal monitor provided on an instrument panel, a meter panel, or the like to display an image relating to an acceleration notification or the like. As described above, the monitor 25 is provided as a touch panel that also serves as the input switch 24.

The speaker 26 is provided on an instrument panel, a center console, a front pillar, a dashboard, or the like, and is a device for outputting audio relating to acceleration notifications and the like.

The camera 27 is an image capture device for capturing images of the surroundings of the vehicle 12. The camera 27 may be provided outside the vehicle or inside the vehicle. The peripheral images of the vehicle 12 captured by the camera 27 are stored in the storage 20D.

The sensor 28 is, for example, a sensor that outputs electromagnetic waves other than visible light toward the periphery of the vehicle 12, and detects an object using the reflected waves of the electromagnetic waves. The sensor 28 is, for example, an infrared sensor, an ultrasonic sensor, or a millimeter-wave radar.

Figure 4:
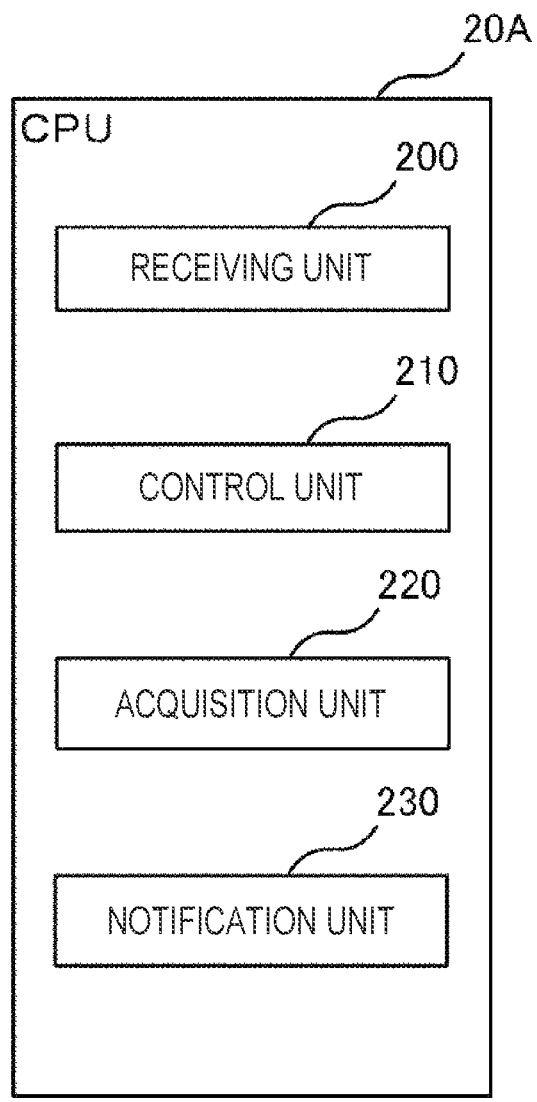
FIG. 4 is an example of a diagram illustrating a functional configuration of an onboard unit of an exemplary embodiment.

In the onboard unit 20 of the present exemplary embodiment, the CPU 20A executes a processing program, whereby it functions as the receiving unit 200, the control unit 210, the acquisition unit 220, and the notification unit 230 illustrated in FIG. 4.

The receiving unit 200 has a function of receiving an abnormality notification from an occupant of the vehicle 12. In the present exemplary embodiment, the receiving unit 200 receives an abnormality notification from an occupant via the input switch 24. Note that in cases in which the notification system 10 includes a user terminal such as a smartphone carried by an occupant, the receiving unit 200 may receive an abnormality notification from a user terminal via the wireless communication I/F 20E.

The control unit 210 has a function of locking or closing at least one of a lock or a window of a door of the vehicle 12 in a case in which the receiving unit 200 receives an abnormality notification. More specifically, the control unit 210 outputs a signal to at least one of the door lock ECU 22A or the window ECU 22B. For example, in a case in which the control unit 210 outputs a door locking signal to the door lock ECU 22A, the actuators of the door lock mechanism are drive-controlled. The door of the vehicle 12 is then locked. On the other hand, in a case in which the control unit 210 outputs a close signal to the window ECU 22B, the actuators of the window lock mechanism are drive-controlled. The window of the vehicle 12 then closes.

The acquisition unit 220 has a function of acquiring an inter-vehicle distance, which is a distance between the vehicle 12 and peripheral vehicles around the vehicle 12. In the present exemplary embodiment, the acquisition unit 220 acquires the inter-vehicle distance from the sensor data acquired by the sensor 28. Moreover, the acquisition unit 220 acquires an image of the surroundings of the vehicle 12 captured by the camera 27, and stores the acquired image in the storage 20D. Moreover, the acquisition unit 220 stores the current position of the vehicle 12 measured by the GPS device 23 in the storage 20D as position information.

In a case in which the receiving unit 200 receives an abnormality notification, the notification unit has a function of notifying a third party of vehicle information including position information and peripheral images of the vehicle 12 stored in the storage 20D of the vehicle 12, as well as of the fact that the vehicle 12 is in an abnormal situation. Note that a third party refers to a police station or a security company. The notification unit 230 of the present exemplary embodiment, by notifying the center server 30 of vehicle information and of the fact that the vehicle 12 is in an abnormal situation, notifies the police station or the security company of the vehicle information and of the fact that the vehicle 12 is in an abnormal situation. Moreover, in the present exemplary embodiment, the notification unit 230, in a case in which the receiving unit 200 receives an abnormality notification, and in a case in which the inter-vehicle distance acquired by the acquisition unit 220 is less than a predetermined threshold D1, notifies the center server 30 of the vehicle information and the fact that the vehicle 12 is in an abnormal situation.

Note that the predetermined threshold D1 may be determined for each positional relationship between the vehicle 12 and a peripheral vehicle. More specifically, in cases in which the peripheral vehicle is traveling leftward or rightward with respect to the vehicle 12, compared to cases in which the peripheral vehicle is traveling in a forward direction or rearward direction relative to the vehicle 12, the predetermined threshold D1 may be set smaller. The predetermined threshold D1 may be determined according to the travel speed of the vehicle 12 or the peripheral vehicle, or the type of the vehicle 12 or the peripheral vehicle, or the like.

Moreover, there is no limitation on whether or not the inter-vehicle distance acquired by the acquisition unit 220 is less than a predetermined threshold D1, and in cases in which the receiving unit 200 receives an abnormality notification, notification of the vehicle information and the fact that the vehicle 12 is in an abnormal situation may be provided to the center server 30.

Moreover, in cases in which the notification unit 230 receives abnormality notifications plural times in succession, notification of the vehicle information and the fact that the vehicle 12 is in an abnormal situation may be provided to the center server 30, and in cases in which the abnormality notification is received on one occasion only, notification of the vehicle information and the fact that the vehicle 12 is in an abnormal situation need not be provided to the center server 30.

The vehicle information may include text information displayed on an identification tag, such as the license plate, of the peripheral vehicle, the lighting state of the headlights of the peripheral vehicle, the lighting state of the winkers of the peripheral vehicle, and the sounding state of the horn sound of the peripheral vehicle.

Moreover, in a case in which the inter-vehicle distance acquired by the acquisition unit 220 is less than the predetermined threshold D1 and the receiving unit 200 has not received an abnormality notification, the notification unit has a function of notifying an occupant so as to change the lane in which the vehicle 12 is traveling. In the present exemplary embodiment, the notification unit 230 performs the notification via the monitor 25 and the speaker 26.

Moreover, in cases in which the receiving unit 200 receives an abnormality notification, the notification unit has a function of notifying an occupant so as to stop the vehicle 12 after changing the lane in which the vehicle 12 is traveling, or so as to move further away from the peripheral vehicle. Note that in a case in which the receiving unit 200 receives the abnormality notification and in a case in which the inter-vehicle distance acquired by the acquisition unit 220 is less than a predetermined threshold D1, the notification unit 230 may perform the above-described notification.

(Flow of Control)

Figure 5:
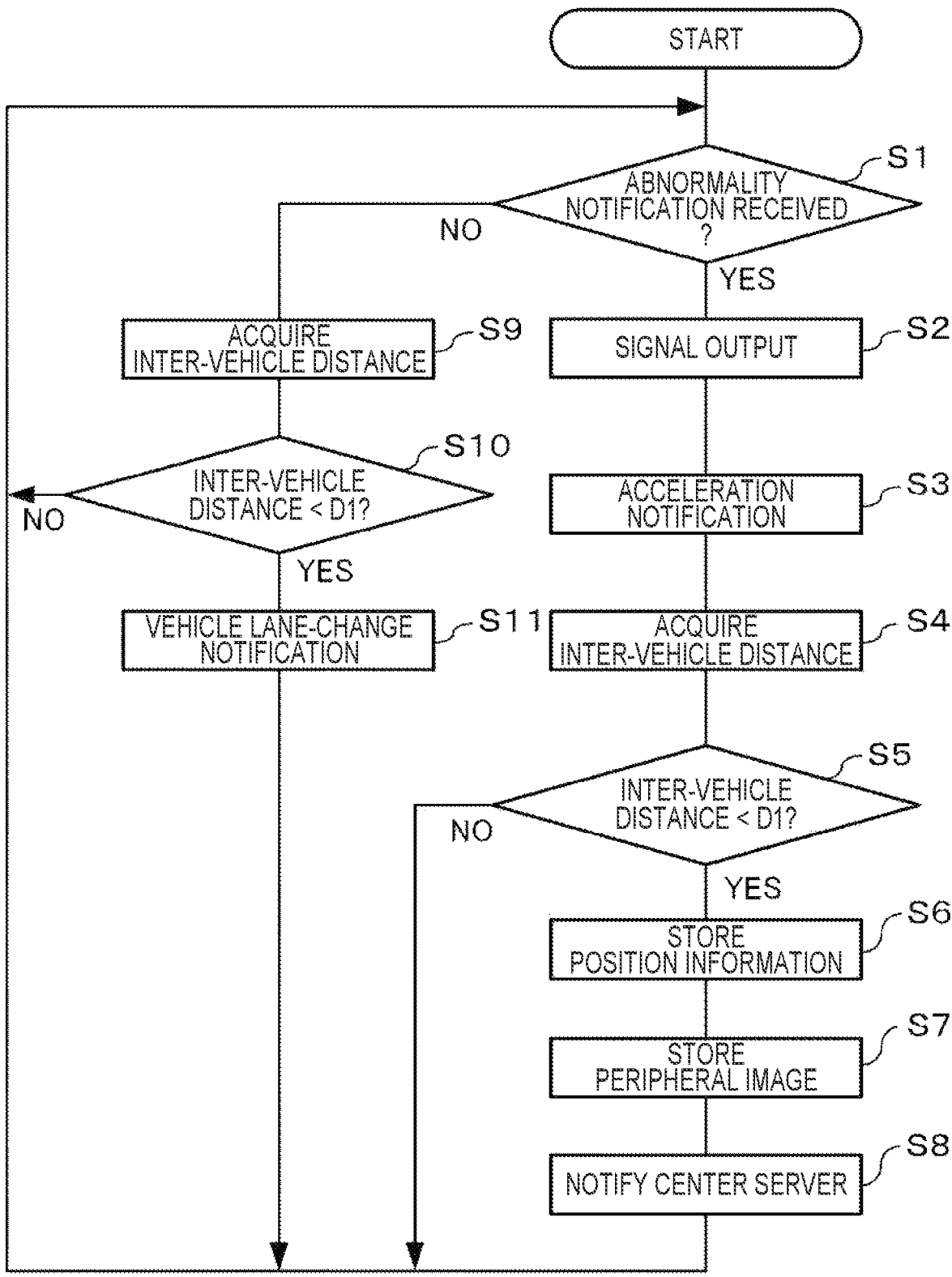
FIG. 5 is an example of a flow chart illustrating a flow of notification processing at an onboard unit of an exemplary embodiment.

Explanation follows regarding a flow of notification processing executed by the onboard unit 20 of the present exemplary embodiment, with reference to the flowchart of FIG. 5. Notification processing is performed by the CPU 20A reading the processing program from the ROM 20B or the storage 20D and expanding and executing in the RAM 20C.

At step S1 in FIG. 5, the CPU 20A determines whether or not an abnormality notification has been received from an occupant via the input switch 24. Upon receiving an abnormality notification from an occupant (step S1: YES), the CPU 20A transitions to step S2.

At step S2, the CPU 20A outputs a signal to at least one of the door lock ECU 22A or the window ECU 22B.

At step S3, the CPU 20A performs acceleration notification. More specifically, the CPU 20A, via the monitor 25 and the speaker 26, notifies the occupant so as to stop the vehicle 12, or so as to move further away from the peripheral vehicle, after changing the lane in which the vehicle 12 is traveling.

At step S4, the CPU 20A acquires the inter-vehicle distance from the sensor data acquired by the sensor 28.

At step S5, the CPU 20A determines whether or not the inter-vehicle distance is less than a predetermined threshold D1. In a case in which the inter-vehicle distance is less than a predetermined threshold D1 (step S5: YES), the CPU 20A transitions to step S6. On the other hand, in a case in which the inter-vehicle distance is equal to or greater than a predetermined threshold D1 (step S5: NO), the CPU 20A returns to step S1.

At step S6, the CPU 20A acquires the current position of the vehicle 12 measured by the GPS device 23, and stores this current position in the storage 20D as position information.

At step S7, the CPU 20A acquires an image of the surroundings of the vehicle 12 captured by the camera 27, and stores the acquired image in the storage 20D.

At step S8, the CPU 20A notifies the center server 30 of vehicle information including the position information and peripheral images of the vehicle 12 stored in the storage 20D, as well as of the fact that the vehicle 12 is in an abnormal situation, and returns to step S1.

Further, on returning to step S1, in cases in which the CPU 20A has not received an abnormality notification from an occupant (step S1: NO), the processing transitions to step S9. At step S9, the CPU 20A acquires the inter-vehicle distance from the sensor data acquired by the sensor 28.

At step S10, the CPU 20A determines whether or not the inter-vehicle distance is less than a predetermined threshold D1. In a case in which the inter-vehicle distance is less than a predetermined threshold D1 (step S10: YES), the CPU 20A transitions to step S11. On the other hand, in a case in which the inter-vehicle distance is equal to or greater than a predetermined threshold D1 (step S10: NO), the CPU 20A returns to step S1.

At step S11, the CPU 20A notifies the occupant via the monitor 25 and the speaker 26 so as to change the lane in which the vehicle 12 is traveling, and returns to step S1.

[Notes]

In the above-described exemplary embodiments, the onboard unit 20 installed in the vehicle 12 is applied as the notification device. However, the present disclosure is not limited to this example. For example, a device configured separately from the vehicle 12 may be applied as the notification device.

Moreover, in the above-described exemplary embodiments, a police station or a security company is applied as a third party. However, the present disclosure is not limited to this example. As a third party, any person other than an occupant of the vehicle 12 may be applied. For example, as a third party, a person who is not onboard a predetermined vehicle 12, such as a family member or friend of an occupant of the vehicle 12, may be applied.

In the above exemplary embodiments, the third party is notified of the vehicle information and the fact that the vehicle 12 is in an abnormal situation by the onboard unit 20 transmitting vehicle information and the fact that the vehicle 12 is in an abnormal situation to the center server 30. However, the present disclosure is not limited to this example. The onboard unit 20 may use a display device, speaker, or the like provided outside the vehicle 12, to directly notify a third party of the vehicle information and the fact that the vehicle 12 is in an abnormal situation.

Note that the various processing executed by the CPU 20A reading and executing software (a program) in the above exemplary embodiments may be executed by various types of processor other than a CPU. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The various processing described above may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Although explanation has been given regarding an aspect in which the processing program is stored (installed) in advance in the storage 20D in the above exemplary embodiment, there is no limitation thereto. The program may be provided in a format recorded on a recording medium such as compact disc read only memory (CD-ROM), digital versatile disc read only memory (DVD-ROM), or universal serial bus (USB) memory. Alternatively, the programs may be provided in a format downloadable from an external device over a network.

The flow of processing described in the above exemplary embodiments is also an example, and unnecessary steps may be deleted, new steps may be added, or the processing order may be rearranged within a range not departing from the spirit of the present invention.

The respective configurations of the vehicle 12 and the center server 30 described in the above exemplary embodiments are examples, and may be modified according to circumstances within a range not departing from the spirit of the present invention.

What is claimed is:

1. A notification device, comprising a processor, wherein the processor is configured to:
   receive an abnormality notification from an occupant of a vehicle, and
   in a case in which the abnormality notification has been received, notify a third party of vehicle information including position information of the vehicle and an image of surroundings of the vehicle, which are stored at the vehicle, and notify the third party that the vehicle is in an abnormal situation,
   wherein the processor is further configured to perform control for at least one of locking a door lock or closing a window of the vehicle in a case in which the abnormality notification has been received.

2. The notification device of claim 1, wherein the processor is further configured to:
   acquire a distance between the vehicle and a peripheral vehicle in the surroundings of the vehicle, and
   in a case in which the abnormality notification has been received and the acquired distance is less than a predetermined threshold value, notify the third party of the vehicle information and that the vehicle is in an abnormal situation.

3. The notification device of claim 2, wherein the processor is further configured to notify the occupant so as to change a lane in which the vehicle is traveling in a case in which the acquired distance is less than the predetermined threshold value and the abnormality notification has not been received.

4. The notification device of claim 1, wherein the processor is further configured to notify the occupant so as to stop the vehicle or to move further away from a peripheral vehicle in the surroundings of the vehicle, after having changed a lane in which the vehicle is traveling, in a case in which the abnormality notification has been received.

* * * * *